Figure 1:
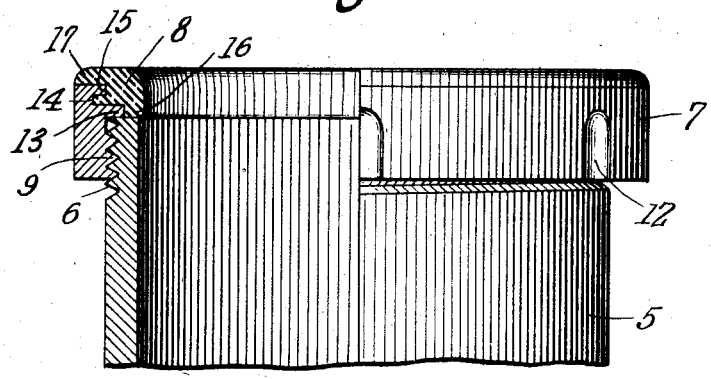

June 28, 1932.  M. J. CAFIERO  1,864,712

INSULATING BUSHING

Filed Sept. 19, 1930

INVENTOR
Michael J. Cafiero
BY
ATTORNEY

Patented June 28, 1932

1,864,712

UNITED STATES PATENT OFFICE

MICHAEL J. CAFIERO, OF BROOKLYN, NEW YORK

INSULATING BUSHING

Application filed September 19, 1930. Serial No. 482,950.

The present invention relates to insulating bushings and end fittings of the type covered in the Cafiero Patent 1,778,714 of October 21, 1930 and is in part a continuation of the subject matter disclosed therein.

Special objects of this invention are to provide an insulating bushing for the ends of electric conduits, which will be strong and durable, but relatively light in weight and small in size, so as to be easily handled and take up but small space in shipment and in use, which will have high insulating qualities and which will be desirable and practical in all its intended uses.

In the drawing accompanying and forming part of the following specification certain embodiments of the invention have been illustrated, with the understanding that the structure may be modified as regards these particular disclosures without departure from the true spirit and broad scope of the invention.

Figure 2:
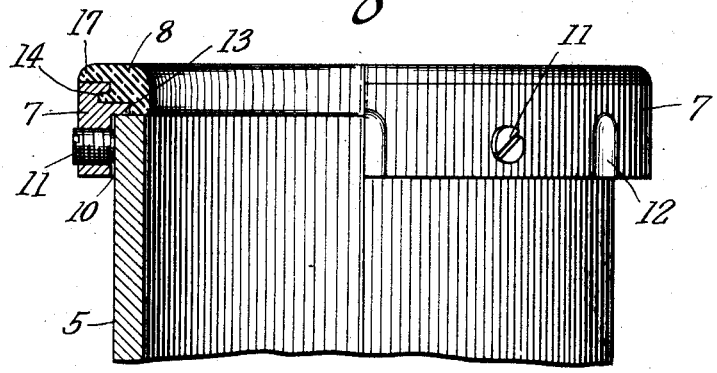
Figure 3:
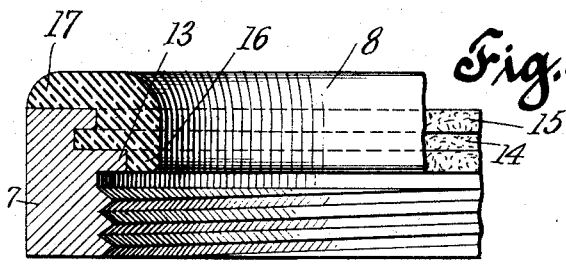

Fig. 1 is a broken side elevation and part vertical sectional view of a form of the invention applied to the screw-threaded end of a conduit; Fig. 2 is a similar view showing an embodiment of the invention applied to the end of an unthreaded conduit; Fig. 3 is a broken fragmentary and sectional view on an enlarged or exaggerated scale showing particularly the inter-locking of the insulation in the base ring.

In Figs. 1 and 2, sections of electric conduit are indicated at 5 and in the first view the end of the conduit is shown as screw-threaded at 6, whereas in the second view the end of the conduit is smooth or unthreaded, both forms being common.

The bushing consists of two parts, a light but strong metallic base ring 7 and a ring 8 of insulating material seated in locked relation in the end of the base ring.

The base ring is either screw-threaded as indicated at 9 in Fig. 1 or has a plain lower end portion as indicated at 10 in Fig. 2, depending upon whether it is to be used on the screw-threaded or unthreaded end of the conduit. In the latter instance, set screws 11 are usually provided in the skirt portion of the ring for securely fastening the same to the conduit. Flutes, depressions or lugs 12 may be provided in or on the exterior of the ring for engagement by a suitable turning tool.

At the upper end of the socket portion, which fits over the end of the conduit, there is provided a thin inwardly projecting annular flange 13 shown as of relatively narrow extent, so as to extend over the end of the conduit without entirely covering the same. This narrow thin flange thus forms an abutment for seating the ring on the conduit.

Above the abutment flange the base ring is shown as having an internal undercut annular groove 14 providing an interlock for the insulation. An additional interlock is afforded in the present disclosure by leaving the inner faces of the ring rough and unfinished as indicated at 15, for example, the cast surface as it comes from the mold. In addition to providing an interlock for the insulation, the leaving of the cast surfaces in their original condition saves expense in the manufacture of the article.

The insulation in the present disclosure is molded into the ring or collar in suitable dies and under sufficient pressure to permanently set and interlock the material in the undercut groove or recess and in the rough unfinished surface of the ring. A phenol condensation product may be used as the insulating material, the same being particularly suitable, because it can be made to properly interlock with the metallic ring and because it is hard and substantially as strong as the ring itself, reinforced as it is by the ring when interlocked as illustrated. Further reinforcement of the insulation is effected in the illustration by causing a lip 16 of the insulation to extend down over the edge of the abutment flange 13 into position to abut the end of the conduit. This lip covering as it does the abutment flange prevents that flange from cutting the insulation of any wiring, covers the end of the conduit sufficiently to prevent any burrs on the end of the conduit from cutting the wiring and transfers weight or strain on the insulation to the end of the conduit.

The molded insulation is shown also as extending over the top of the base ring in the nature of an overstanding flange 17. This gives end support to the insulation and prevents contact of wires with the upper end of the base ring.

The insulating ring portion 8 is shown in the illustration as having only a single opening for the wires or cables, which opening is of slightly less diameter than the interior of the conduit, so as to hold the wires or cable away from the walls of the conduit, but it will be understood that if required, this ring of insulating material may be formed with a plurality of appropriately placed openings to guide a number of wires or cables in separated relation. Other changes may be made within the scope of the invention as defined by the following claim.

What is claimed is:

An insulated bushing comprising a mounting ring constructed for engagement over the end of an electric conduit, said ring having intermediate the ends of the same a narrow internal annular flange to extend in partly over the end of the conduit and having above said flange an undercut portion and rough internal surfaces and a ring of insulating material interlocked with said undercut portion and rough surfaces of the mounting ring, said ring of insulating material extending over the end of the mounting ring and within the internal flange, whereby to form a continuous insulating covering over the end of the mounting ring to a point inside the end of the conduit to which the bushing is applied.

In testimony whereof I affix my signature.

MICHAEL J. CAFIERO.